United States Patent [19]

Santoso et al.

[11] 4,400,434

[45] Aug. 23, 1983

[54] FLUOROELASTOMER COMPOSITE FRICTION MATERIAL

[75] Inventors: Muljadi Santoso, Hamden; Michael A. DiPino, West Haven, both of Conn.

[73] Assignee: Raymark Industries, Inc., Trumbull, Conn.

[21] Appl. No.: 322,643

[22] Filed: Nov. 18, 1981

[51] Int. Cl.$^3$ .................. B32B 27/00; B32B 5/16
[52] U.S. Cl. ................ 428/421; 260/998.13; 428/323; 428/422; 523/157
[58] Field of Search ............ 428/325, 421, 422, 323; 523/157; 260/998.13

[56] References Cited

U.S. PATENT DOCUMENTS

| | | | |
|---|---|---|---|
| 3,766,130 | 10/1973 | Johnson | 260/998.13 B X |
| 3,898,361 | 8/1975 | Bjerk et al. | 428/325 |
| 4,042,085 | 8/1977 | Bjerk et al. | 428/325 X |
| 4,045,402 | 8/1977 | Bjerk et al. | 428/325 X |
| 4,131,590 | 12/1978 | DeFrank | 523/157 |
| 4,178,278 | 12/1979 | Reynolds, Jr. | 523/157 |

*Primary Examiner*—Thomas J. Herbert, Jr.
*Attorney, Agent, or Firm*—Gary, Juettner & Pyle

[57] ABSTRACT

Carbonaceous fibers are incorporated into a fluoroelastomer matrix to provide an improved wet friction material having superior performance characteristics at elevated temperatures.

9 Claims, No Drawings

FLUOROELASTOMER COMPOSITE FRICTION MATERIAL

BACKGROUND OF THE INVENTION

This invention relates to improvements in elastomer-based friction materials and more particularly to such friction elements, i.e., clutch, brake in the like, which run in oil and are referred to as wet friction materials. In a typical application, the friction element is secured to a backing plate, and the element is brought into engagement with a relatively moving reaction plate to achieve power transfer or braking action.

Prior art wet friction materials have traditionally included friction elements made from paper, or from sintered bronze, or from a composite having a resin binder such as phenol formaldehyde. Although these materials are useful over a wide range of applications, the advent of larger and more powerful industrial vehicles has created a need for a material having even higher energy absorption rates and an improved service life at higher than normal operating temperatures.

More recently, elastomers have been used as the binder or base material in friction materials, as for example are described in U.S. Pat. Nos. 3,898,361, 4,042,085, 4,045,402 and 4,131,590. The use of an elastomer has several advantages, inasmuch as the resultant material has greater elasticity than traditional materials and therefore exhibits better energy absorption rates. The relatively low modulus of the material also allows the friction to better conform to irregular or uneven surfaces of the mating member without undue wear.

A primary limiting factor in the use of elastomers in friction materials is the thermal stability of the elastomer. In the event the thermal stability of the elastomer is exceeded, the friction element will lose its strength and fail rapidly, thus requiring replacement. For this reason, it would be desirable to select an elastomer which has a high thermal stability.

Of the elastomers that are presently available on a commercial basis, fluoroelastomers exhibit superior thermal stability. U.S. Pat. No. 3,898,361 in particular describes a friction material composed of a fluoroelastomer matrix into which is incorporated silica-based or glass fibers. The glass fibers serve to reinforce the elastomer and also serve as friction fillers to provide the desired coefficients of friction.

Although friction materials based on mixtures of fluoroelastomers and silica-based fibers offer excellent performance, the industry continues to seek even better performance, particularly at higher energies and temperatures experienced in advanced equipment. Especially at higher temperatures, it has been found that the fluoroelastomer and glass fiber composite tends to become brittle and weak causing the material to fail prematurely.

SUMMARY OF THE INVENTION

In accordance with the present invention, it has been found unexpectedly that a superior friction material may be prepared by compounding a friction material from a fluoroelastomer and certain types of fibers other than silica-based fibers, particularly carbon fibers or other types of fibers based on carbon as defined herein. The friction materials thus prepared exhibit greatly improved thermal stability and also unexpectedly exhibit other improved performance properties in comparison to similar materials compounded with glass fibers.

In retrospect, it is postulated that at elevated temperatures, fluoroelastomers may evolve highly corrosive hydrogen fluoride, which may attack and erode silica-based fibers, causing loss of adhesion between the elastomer and the fiber. Also, silicon fluoride may be produced, which may react with the elastomer, causing it to become brittle. In any event, the problem of loss of strength and elasticity is greatly reduced by the use of the carbon-based fibers as described and claimed herein.

The friction material is prepared by intimately mixing the carbonaceous fibers with uncured elastomer, together with curatives and other optional additives, forming the mixture into the desired shape, and then curing the elastomer.

DESCRIPTION OF THE PREFERRED EMBODIMENTS

The friction material of the present invention utilizes a fluoroelastomer as a base or binder, into which is incorporated certain types of chemically and heat resistant fibers and fillers prior to shaping and curing of the elastomer.

The preferred fluoroelastomers useful in the practice of the present invention include copolymers of vinylidene fluoride and hexafluoropropylene, terpolymers of vinylidene fluoride, hexafluoropropylene and tetrafluoroethylene, and alternating copolymers of propylene and tetrafluoroethylene. Such fluoroelastomers are available commercially under the trademarks "Viton", "Fluorel", "Aflas" and the like. Fluoroelastomers of the foregoing type have excellent solvent and oil resistance and also have the highest temperature resistance of all commercially available elastomers.

The fibers incorporated into the elastomer are preferably carbon fibers, precursers of carbon fibers, or synthetic polymer fibers having a significant carbon content. Such fibers are generally unreactive with hydrogen fluoride, or in any event, do not form chemical intermediates with fluorides that are detrimental to the fluoroelastomer.

Various types of carbon fibers are available and include those prepared from carbonizing rayon or polyacrylonitrile fibers, as well as those prepared from mesophase and nonmesophase pitch precursers. Also suitable are heat treated polymer fibers or carbon fiber precursers, such as heat stabilized acrylic fibers sold under the trademarks "Celiox" and "Pan-Ox". Other particularly suitable fibers included untreated fibers such as cross-linked phenolic fiber, acrylic, polyamid, rayon and other cellulosic fibers. To the extent that these latter fibers are reduced to carbon upon heating, they together with the carbon fibers and precursers described herein, will be collectively referred to herein as carbonaceous fibers. The foregoing carbon fibers, carbon fiber precursers and char-producing fibers may be employed alone or in admixture with one other.

The amount of carbonaceous fiber relative to the amount of binder may vary within wide limits. Generally, the elastomer matrix should be sufficient to adequately find the volume of fiber being employed. Depending on the actual formulation employed, the ratio of the volume of the elastomer to the volume of the fiber may vary within the range of from about 20 to 1 to about one to 2.

In addition, other fillers and friction modifiers may be incorporated into the elastomer to provide added strength and/or to alter or improve the friction characteristics of the resulting material. Since fluoroelastomers are relatively expensive elastomers, it is normally desirable to incorporate a relatively inexpensive and inert organic or inorganic powdered filler to reduce unit costs and/or improve properties. The filler, such as carbon black, may be incorporated in amounts ranging from nil up to about 60 percent per unit volume of the material. Suitable friction modifiers are typically powdered solids and may include substances such as barium sulfate, molybdenum disulfide, alumina, silica, petroleum coke, graphite, carbon black, powdered metals, powdered polymers, mixtures thereof, and the like. The friction material may be successfully formulated without friction modifiers, and if added, may occupy up to about 20 percent of the volume of the final product. The fillers and friction modifiers described herein in some instances interchangeable, and the percentages used are not critical.

In addition to the foregoing, minor amounts of conventional accelerators, stabilizers, processing aids and curing agents suitable for fluoroelastomers may be incorporated into the fluoroelastomer.

The friction material is prepared by uniformly mixing the uncured elastomer, carbonaceous fibers and any other ingredients together until a uniform mixture is obtained. Conventional apparatus, such as a banbury mixer, may be employed. The final mixture will preferably contain, by units of volume, from about 20 to about 70 percent of fluoroelastomer and from about 5 to about 40 percent carbonaceous fibers, with the remainder as curatives and optional fillers and friction modifiers within the aforesaid recited ranges.

Following the mixing procedure, the mixture is formed into the shape of a friction member, typically a grooved disc or ring shape, and is then cured under heat and pressure. Several methods available for this purpose. The material may first be sheeted on a conventional sheeter, cut into the desired shape, and subsequently cured. In the alternative, the material may be extruded or may be molded, such as by injection, compression or transfer molding techniques. Grooves may be imparted in the outside surface of the friction element either by molding or by cutting the grooves in the cured piece.

Regardless of the method used to process the material, it is also necessary to secure the friction element to a rigid backing member such as a steel plate. This may be done either by compression molding the element against the backing member with the addition of a small amount of an adhesion promoter and/or by securing the friction element to the backing member with a suitable adhesive.

The elastomer is cured under conventional conditions depending on the type of elastomer and the curatives employed. Generally, heat and pressure are applied simultaneously, for example, at temperatures of about from 350 to about 475 degrees F. and at pressures of from about 50 to about 4,000 pounds per square inch until the elastomer has fully cured.

The cured friction material of the present invention, after being mounted on a backing plate, is typically incorporated into a mechanical assembly having oil circulating therein. The friction plate is brought into and out of engagement with a relatively rotating reaction plate, which may occur at various speeds and pressures.

The friction material of the present invention may be formulated to possess a wide range of friction levels. The dynamic coefficient of friction may range from about 0.06 to about 0.20, and the static coefficient of friction may range from about 0.08 to about 0.30.

In further illustration of specific compositions and advantages and utility of the present invention, the following examples are given.

EXAMPLE I

The following samples were prepared by mixing the following specified fiber, 36% by volume, with 46% by volume fluoroelastomer (Viton E-60C), 14% by volume Carbon Black (N-990) and 4% by volume curatives:

| Sample No. | Fiber |
|---|---|
| 1 | Fiberglass (RCI 657) |
| 2 | Carbon (KUREHA C103T) |
| 3 | Phenolic (KYNOL KF02 BT) |

Each sample was sheeted to the same thickness cured at 350° F. for 15 minutes and postcured at 400° F. for 24 hours and cut into pieces of identical size. All of the samples were heat aged in an oven maintained at 550° F., and the tensile strength of each was tested at every 24 hour interval. The following are the results of such tests, in terms of percentage of original elongation retained.

|  | 24 Hr. | 48 Hr. | 72 Hr. |
|---|---|---|---|
| Sample 1 | 0 | — | — |
| Sample 2 | 99 | 95 | 70 |
| Sample 3 | 68 | 65 | 60 |

It may be seen that Sample 1 containing glass fibers was too brittle to test at the end of 48 hours whereas the samples containing the carbonaceous fibers retained substantial elasticity for periods in excess of 72 hours.

EXAMPLE II

The following compositions were prepared as friction materials.

| Material | Vol. % | Weight % |
|---|---|---|
| Sample A |  |  |
| Fluoroelastomer (Viton E-60) | 39.64 | 35.11 |
| Fiberglass | 31.07 | 38.62 |
| Carbon Black | 23.91 | 21.07 |
| Additives and Curatives | 5.37 | 5.19 |
| Sample B |  |  |
| Fluoroelastomer (Viton E-60) | 39.64 | 40.76 |
| Carbon Fiber (Kureha C 103T) | 31.07 | 28.77 |
| Carbon Black | 23.90 | 24.44 |
| Additives and Curatives | 5.39 | 6.03 |
| Sample C |  |  |
| Fluoroelastomer (Viton E-60) | 39.64 | 43.68 |
| Phenolic Fiber (Kynol KF02 BT) | 31.07 | 23.65 |
| Carbon Black | 23.92 | 26.21 |
| Additives and Curatives | 5.37 | 6.45 |
| Sample D |  |  |
| Fluoroelastomer (AFLAS 150E) | 41.56 | 40.00 |
| Carbon Fiber (Kureha C 103T) | 31.07 | 30.86 |

-continued

| Material | Vol. % | Weight % |
| --- | --- | --- |
| Carbon Black | 23.93 | 26.74 |
| Additives and Curatives | 3.44 | 2.40 |

EXAMPLE III

Samples A, B, C and D were each sheeted to the same thickness, cut into rings of the same size, and applied to a steel backing plate. The rings were then bonded and cured under 100 psi for 15 minutes at 350° F. and post cured at 400° F. for 24 hours. Sample D was post cured at 400° F. for 16 hours. The samples were then tested on a dynamometer under the same conditions, and the following data was generated:

| Material | Dynamic Friction (At 7000 FPM, 150 PSI) | Static Friction | Failpoint Ft/min-PSI | Power Energy Rating (Ft.lb./ Sec. $\frac{1}{4} \times 10^{-4}$) |
| --- | --- | --- | --- | --- |
| Sample A | 0.086 | 0.098 | 9,000–200 | 4.0 |
| Sample B | 0.134 | 0.155 | 11,000–150 | 6.2 |
| Sample C | 0.095 | 0.100 | 9,000–150 | 4.0 |
| Sample D | 0.106 | 0.129 | 11,000–50 | 5.0 |

It may be seen from the foregoing that fluoroelastomer friction materials containing carbonaceous fibers exhibit friction properties comparable to similar compositions containing glass fibers (Sample A), and that the use of carbon fibers allows for comparable or higher fail point ratings and power energy ratings.

We claim:

1. An improved friction material of the type comprising a fluoroelastomer and reinforcing fibers and wherein the material is mounted on a rigid backing plate and brought into engagement with a reaction member, said friction material comprising the combination of a fluoroelastomer and carbonaceous fibers, wherein all of said reinforcing fibers present in said friction material are substantially unreactive with said fluoroelastomer at elevated temperatures, said friction material having a dynamic coefficient of friction of from about 0.06 to about 0.20 and a static coefficient of friction of from about 0.08 to about 0.30.

2. The friction material of claim 1 wherein the ratio of the volume of the fluoroelastomer to the volume of the fiber is from about 20 to 1 to about one to 2.

3. The friction material of claim 1 wherein said fluoroelastomer is selected from the group consisting of copolymers of vinylidene fluoride and hexafluoropropylene, terpolymers of vinylidene fluoride, hexafluoropropylene and tetrafluoroethylene, and alternating copolymers of propylene and tetrafluoroethylene, and mixtures thereof.

4. The friction material of claim 1 wherein said carbonaceous fibers comprise carbon fibers and organic fibers reducible to carbon.

5. A friction assembly comprising a friction material mounted on a backing plate and being engageable with a reaction plate, said assembly having oil circulating therein, said friction material comprising a cured mixture of a fluoroelastomer and carbonaceous reinforcing fibers in a volume ratio of from about 20 to 1 about one to 2, said friction material having a dynamic coefficient of friction of from about 0.06 to about 0.20 and a static coefficient of friction of from about 0.08 to about 0.30, all of the reinforcing fibers present in said friction material being substantially unreactive with said fluoroelastomer at elevated temperatures.

6. A friction material consisting essentially of, by volume, from about 20 to about 70 percent fluoroelastomer, from about 5 to about 40 percent carbonaceous fibers, zero to about 60 percent fillers, and zero to about 20 percent friction modifiers, said carbonaceous fibers reinforcing said fluoroelastomer and improving the stability of said friction material at elevated temperatures, said friction material having a dynamic coefficient of friction of from about 0.06 to about 0.20 and a static coefficient of friction of from about 0.08 to 0.30.

7. The friction material of claim 6 wherein said friction material is secured to a rigid backing member for coaction with a second member.

8. The friction material of claim 6 wherein said fluoroelastomer is selected from the group consisting of copolymers of vinylidene fluoride and hexafluoropropylene, terpolymers of vinylidene fluoride, hexafluoropropylene and tetrafluoroethylene, and alternating copolymers of propylene and tetrafluoroethylene, and mixtures thereof.

9. The friction material of claim 6 wherein said carbonaceous fibers are selected from the group consisting of carbon fibers, fibers reducible to carbon, and mixtures thereof.

* * * * *